No. 778,340. PATENTED DEC. 27, 1904.
J. STUBER.
EAR AND BAIL FOR CULINARY VESSELS.
APPLICATION FILED MAR. 5, 1904.
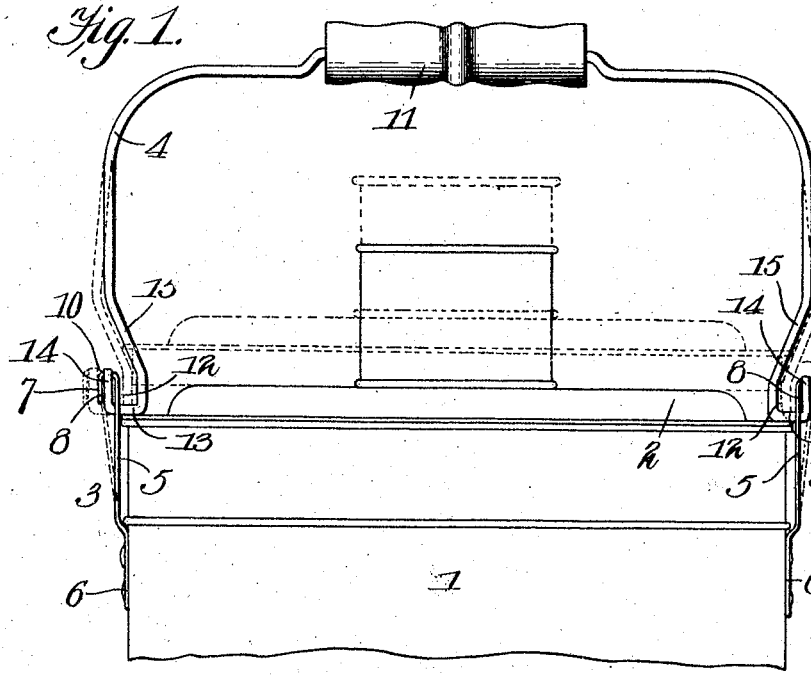
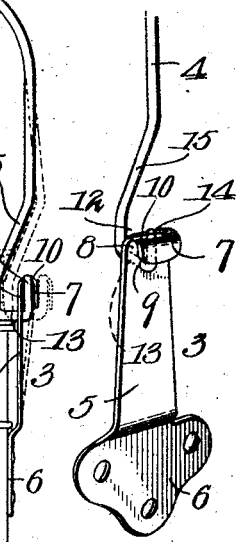
Joseph Stuber
Inventor
Witnesses
by C. A. Snow & Co
Attorneys No. 778,340. Patented December 27, 1904.

UNITED STATES PATENT OFFICE.

JOSEPH STUBER, OF PEORIA, ILLINOIS.

EAR AND BAIL FOR CULINARY VESSELS.

SPECIFICATION forming part of Letters Patent No. 778,340, dated December 27, 1904.

Application filed March 5, 1904. Serial No. 196,672.

*To all whom it may concern:*

Be it known that I, JOSEPH STUBER, a citizen of the United States, residing at Peoria, in the county of Peoria and State of Illinois, have invented a new and useful Ear and Bail for Culinary Vessels, of which the following is a specification.

This invention relates to an improved ear and bail for use upon pails, and has for its objects to produce a simple inexpensive device of this character wherein one of the parts is provided with a locking means or device automatically operable by the seating of the lid or cover for securing the latter in position upon the pail.

With these and other objects in view the invention comprises the novel features of construction and combination of parts more fully hereinafter described.

In the accompanying drawings, Figure 1 is a side elevation of a portion of a pail, showing one form of embodiment of the ear and bail applied thereto. Fig. 2 is a detail perspective view of the ear and bail shown in Fig. 1.

Referring to the drawings, 1 designates a pail; 2, the lid or cover therefor; 3, the bail-receiving ears attached by rivets or otherwise to the pail, and 4 the bail. These parts, with the exception of the ear and bail, may be of the usual or any preferred construction and material, inasmuch as they constitute no part of the present invention.

The bail-receiving ears 3, as illustrated in Figs. 1 and 2, are composed from sheet spring metal of suitable weight or thickness and in the form of an elongated strap or body portion 5, provided at its lower end with an enlargement or head 6, which receives the attaching-rivets, and at its upper end folded outward and backward upon itself to produce an overturned portion or lip 7. This lip 7 is spaced, as at 8, from the body portion 5, which is perforated at 9, while the connecting-wall between the lip and body portion is slotted in a direction transversely of the latter, as at 10, for the purpose which will presently appear.

The bail 4, which is composed, as usual, from heavy wire and carries a wooden handpiece 11, is bent at its ends to form hooks 12 for engagement, respectively, with the perforations 9 of the ears 3. These hooks each have a substantially horizontal portion 13, which extends inward over the lid or cover 2 and constitutes the locking means or devices for securing the latter in position upon the pail, the portion 13, which engages the perforation 9, being provided at its outer end with a right-angularly-extending finger 14, adapted when the bail is swung to carrying position to travel in the space 8, with its upper end in engagement with the slot 10, whereby the bail and ear are locked against relative movement in a direction longitudinally of the bail. The bail is also bent adjacent its terminals to produce inwardly-inclined portions or faces 15, which when the bail is in carrying position incline downwardly and inwardly from their upper toward their lower ends and are joined at their lower ends with the inner ends of the horizontal portions 13, attention being here directed to the fact that the upper outer ends of the inclined faces lie in a plane outside of the periphery of the cover 2.

In practice when it is desired to seat and secure the cover upon the pail, the bail being turned to the position as in Fig. 1, the cover is brought to the position indicated by dotted lines in said figure directly above the inclined faces or portions 15 and then pressed downward. This operation causes the lid in passing downward between the inclined portions 15 to move the ends of the bail outward, which action, owing to the bail being interlocked with the ears 3 in the manner above described, springs the upper ends of the ears outward, as indicated by dotted lines, thereby permitting the cover to pass between the inner ends of the horizontal portions or locks 13 and seat upon the top of the pail, after which the ears spring back to normal position, thereby automatically moving the portions 13 inward to locking position over the cover. When it is desired to release the cover, the engaging portions of the bail may be sprung outward by hand, or the operation may be automatically performed by swinging the bail downward to the side of the vessel, which action will cause the peripheral edge of the cover, which, as before stated, lies within the plane of the upper outer end of the incline 15, to engage the latter and spring the bail outward in a manner somewhat similar to that heretofore described for releasing the cover. Attention is here directed to the fact that the slot 10 terminates at its inner end somewhat beyond the transverse center of the ear, whereby when the bail is turned upward it may swing somewhat past center and, owing to the finger 14 engaging with the inner end of the slot, be sustained in its upright position during the heating of the contents of the vessel.

From the foregoing it is apparent that a simple inexpensive device is produced, which in practice will efficiently perform its functions to the attainment of the ends in view; but it is to be understood that minor changes may be made in the details of construction herein set forth without departing from the spirit of the invention. For example, the length of the ears 3 may be changed to adapt them for use upon dinner-pails in which one vessel is nested into another to form a plurality of compartments or for use upon a single-compartment pail, in which latter case the ears will of course be shorter.

Having thus described the invention, what is claimed is—

1. The combination with a vessel and its cover, of ears attached to the vessel and having downturned lips, a bail engaging the ears and having fingers adapted to travel behind the lips to lock the ears and bail against relative movement in a direction longitudinally of the latter, and devices carried by the bail and adapted for automatic engagement with the cover.

2. The combination with a vessel and its cover, of ears attached to the vessel and having downturned lips, a bail engaging the ears and having fingers adapted to travel behind the lips to lock the ears and bail against relative movement in a direction longitudinally of the latter, and locking devices carried by the bail, said locking devices comprising a substantially horizontal portion and an inwardly-inclined portion adapted to be acted upon by the cover for automatically actuating the devices to lock the latter.

3. The combination with a vessel and its cover, of ears attached to the vessel and having downturned lips, the connecting-wall between one of the ears and its lip being slotted, a bail engaging the ears and having fingers adapted to travel behind the lips to lock the parts against relative movement in a direction longitudinally of the bail, one of the fingers being adapted for engagement with the slot, and devices carried by the bail and adapted for automatic engagement with the cover.

In testimony that I claim the foregoing as my own I have hereto affixed my signature in the presence of two witnesses.

JOSEPH STUBER.

Witnesses:
 JOHN J. ZIEGLER,
 WALTER H. KIRK.